Oct. 10, 1950　　　M. R. VOLK　　　2,525,387
FLOAT INCLINOMETER
Filed May 21, 1946
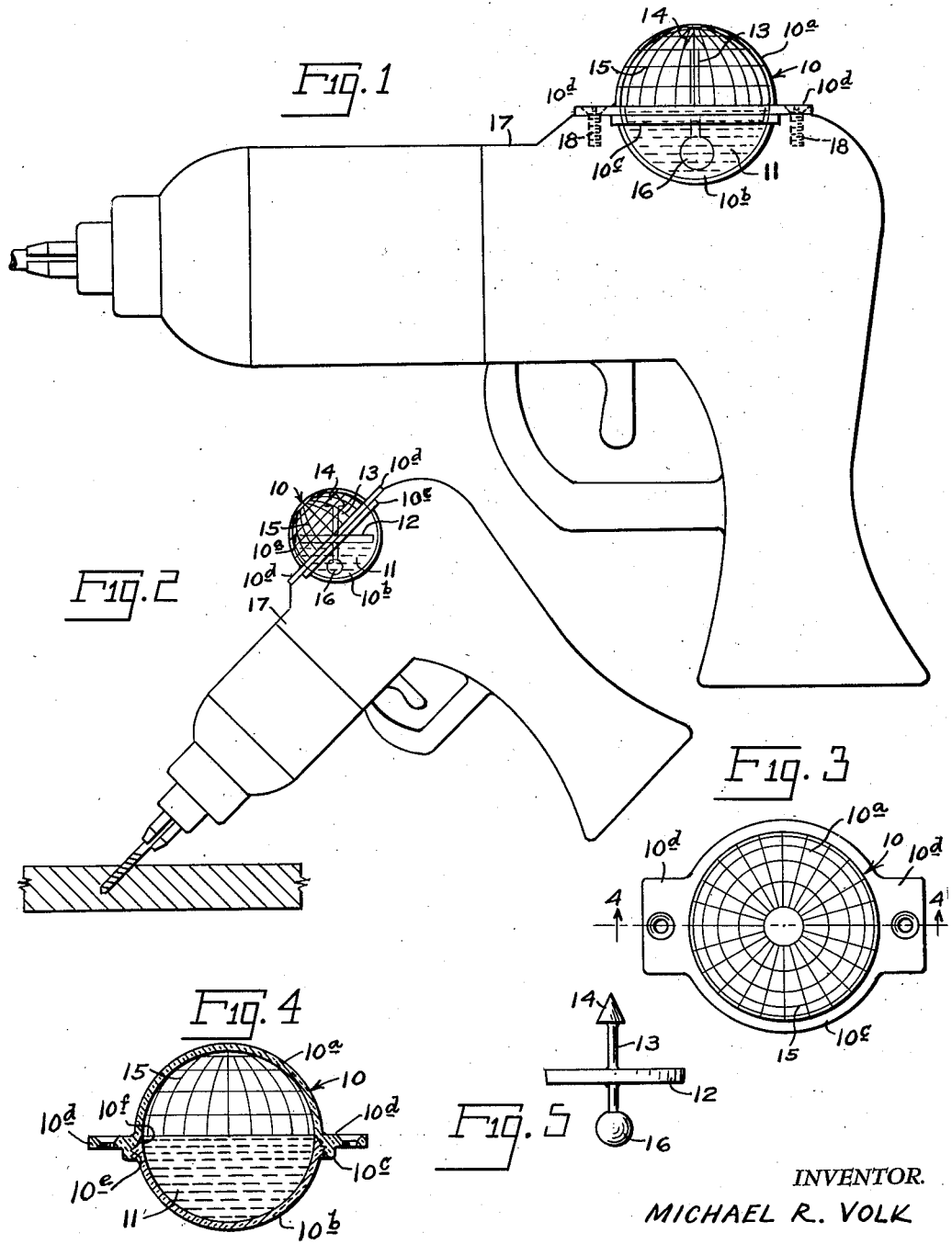
INVENTOR.
MICHAEL R. VOLK
BY Victor J. Evans & Co.
ATTORNEYS Patented Oct. 10, 1950

2,525,387

UNITED STATES PATENT OFFICE 2,525,387

FLOAT INCLINOMETER

Michael R. Volk, Bismarck, N. Dak.

Application May 21, 1946, Serial No. 671,164

1 Claim. (Cl. 33—206)

The invention relates to degree indicator, and more especially to a tool or drill indicator.

The primary object of the invention is the provision of an indicator of this character, wherein its use on a drill or other similar tool will enable accuracy in the drilling operation, in that the angle disposition of the drill bit can be quickly determined for straight boring purposes, whether the drilling be done at an angle or not.

Another object of the invention is the provision of an indicator of this character, wherein the same is at all times in sight of the operator of the drill or other like tool, thus eliminating guess work in the handling thereof with resultant accuracy in the finished work.

A further object of the invention is the provision of an indicator of this character, which is simple in construction, thoroughly reliable and efficient in operation, strong, durable, possessed of few parts, clearly visible on the tool, easily read, assuring a perfect drilling action and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side view of a drill showing the indicator constructed in accordance with the invention applied.

Figure 2 is a view similar to Figure 1 showing the drill in an angle working position.

Figure 3 is an elevation of the indicator housing.

Figure 4 is a side view of the indicator float.

Figure 5 is a plan view thereof.

Similar reference characters indicate corresponding parts throughout the several views in the drawing.

Referring more in detail to the drawing, the numeral 10 designates a hollow sphere shaped body or housing 10 comprising the semi-spherical sections 10a and 10b respectively, the section 10a being provided with an annular flange 10c, having the diametrically opposed apertured ears 10d and the integral internally threaded ring portion 10e to receive the threaded edge 10f of the section 10b whereby the body is assembled as a unit.

The housing 10 contains a liquid 11 of an amount for the floating of a disk-like buoyant carrier 12 for a dialing indicator arrow or hand 13, which protrudes reversely beyond opposite sides of the carrier 12 at the central axis, the tip or arrow head 14 being a pointer for cooperation with a degree scale 15 created externally on the body or housing 10, while the tail tip 16 is a balancing medium for the carrier.

The body or housing 10 is preferably fixed onto the casing 17 of a drill by means of screws 18 entering the apertured ears 10d, and the drill may be either of the electric powered or hand operated type, as best seen in Figures 1 and 2 of the drawing, so that the user of the drill can ascertain from the indicator the accuracy in the drilling operation, as to the angled disposition of the bit or perpendicular or horizontal course to be taken thereby.

It is believed that the operation of the invention will be apparent to those skilled in the art, and it is to be understood that changes in the details of construction, arrangement and combination of parts may be resorted to, provided they fall within the spirit of the invention and the scope of the appended claim.

What is claimed is:

A degree indicator for a tool comprising a hollow semi-spherical section having an internally threaded annular flange extending from its open end, apertured ears extending from the flange and adapted for a connection of the indicator to a tool, a second hollow semi-spherical section being externally threaded and adapted to be connected to the annular flange in a fluid tight manner, degree indications provided on one of the sections, a disk-like buoyant carrier within the sections and in the fluid thereof, an indicator arrow extending from the center of the carrier and a tail tip extending from the opposite face of the carrier and serving to balance the carrier within the fluid.

MICHAEL R. VOLK.

REFERENCES CITED

The following references are of record in the file of this patent:

UNITED STATES PATENTS

| Number | Name | Date |
| --- | --- | --- |
| 949,842 | Pugh | Feb. 22, 1910 |
| 1,234,594 | Wilner | July 24, 1917 |
| 1,294,710 | Roland | Feb. 18, 1919 |
| 1,376,727 | Pentz et al. | May 3, 1921 |
| 1,634,934 | Donaldson | July 5, 1927 |
| 1,640,020 | Abrahamson | Aug. 23, 1927 |

FOREIGN PATENTS

| Number | Country | Date |
| --- | --- | --- |
| 134,511 | Great Britain | 1919 |